United States Patent
Brauneis et al.

(10) Patent No.: US 8,843,912 B2
(45) Date of Patent: *Sep. 23, 2014

(54) OPTIMIZATION OF AN APPLICATION TO REDUCE LOCAL MEMORY USAGE

(75) Inventors: David Brauneis, Raleigh, NC (US); Jeffrey E. Care, Morrisville, NC (US); Curtis E. Hrischuk, Holly Springs, NC (US); Andrew D. Naumann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/400,204

(22) Filed: Feb. 20, 2012

(65) Prior Publication Data

US 2013/0219379 A1 Aug. 22, 2013

(51) Int. Cl.
*G06F 9/44* (2006.01)

(52) U.S. Cl.
USPC .......................................... 717/158

(58) Field of Classification Search
USPC .......................................... 717/158
See application file for complete search history.

(56) References Cited

U.S. PATENT DOCUMENTS

| 5,966,702 | A | 10/1999 | Fresko et al. |
| 6,081,665 | A | 6/2000 | Nilsen et al. |
| 6,634,022 | B1 | 10/2003 | Leermakers |
| 6,658,652 | B1* | 12/2003 | Alexander et al. ............ 717/128 |
| 7,065,760 | B2 | 6/2006 | Dmitriev |
| 7,082,600 | B1 | 7/2006 | Rau et al. |
| 2005/0039187 | A1* | 2/2005 | Avakian et al. ............... 719/310 |
| 2008/0155521 | A1* | 6/2008 | Uola ............................. 717/166 |
| 2010/0146220 | A1* | 6/2010 | Panchenko et al. ........... 711/154 |
| 2011/0138373 | A1* | 6/2011 | Lane et al. .................... 717/157 |

OTHER PUBLICATIONS

Olofsson, "Java memory profiler user guide", Dec. 5, 2004, p. 1-21.*
Kawachiya, K., et al., "FSGC: String Garbage Collection on a Flat Java Heap," [online] Research Report RT0867, IBM Tokyo Research Laboratory, Jul. 17, 2009 [retrieved Feb. 17, 2012] retrieved from the Internet: <http://www.research.ibm.com/trl/people/kawatiya/pub/Kawachiya09resrep2.pdf>, 6 pgs.

(Continued)

*Primary Examiner* — Li B Zhen
*Assistant Examiner* — Duo Khuong Nguyen
(74) *Attorney, Agent, or Firm* — Cuenot, Forsythe & Kim, LLC

(57) ABSTRACT

A method of optimizing an application to reduce local memory usage. The method can include instrumenting at least one executable class file of the application with analysis code, the executable class file including bytecode. The method also can include executing the class file on a virtual machine, wherein during execution the analysis code generates data related to the application's use of local memory. The method further can include, via a processor, analyzing the data related to the application's use of the local memory to generate a memory profile analysis. The method further can include, based on the memory profile analysis, automatically revising at least one portion of the bytecode to reduce an amount of the local memory used by the application.

7 Claims, 3 Drawing Sheets

(56) References Cited

OTHER PUBLICATIONS

Haubl, C., et al., "Compact and Efficient Strings for Java," [online] In Science of COmputer Programming Journal, vol. 75, No. 11, Nov. 2010, [retrieved Feb. 17, 2012] retrieved from the Internet: <www.christianwimmer.at/Publications/Haeubl10a/Haeubl10a.pdf>, 22 pgs.

Wong, B., et al., "Dynamically Loaded Classes as Shared Libraries: An Approach to Improving Virtual Machine Scalability," [online] Int'l Proc. of Parallel and Distributed Processing Symposium, 2003, [retrieved Feb. 17, 2012] retrieved from the Internet: <http://labs.oracle.com/projects/barcelona/papers/ipdps03.pdf>, 10 pgs.

Kawachiya, K., et al., "Analysis and Reduction of Me Mory Inefficiencies in Java Strings," In Proc. of 23rd ACM Conference on Object-Oriented Programming, Systems, Languages, and Applications (OOPSLA '08), Oct. 23, 2008, pp. 385-401.

* cited by examiner

OPTIMIZATION OF AN APPLICATION TO REDUCE LOCAL MEMORY USAGE

BACKGROUND

One or more embodiments disclosed within this specification relate to optimization of local memory usage.

When a software application is executed, local memory resources, such as random access memory (RAM), are allocated for processing of the application. In any particular system, the amount of RAM available is limited, and must be shared among various applications executed on the processing system. When multiple applications are executed on a processing system, the amount of RAM available in the processing system may not be sufficient to accommodate all of the RAM storage that is necessary.

Systems oftentimes are configured to implement memory virtualization to utilize a persistent data storage device, such as a hard disk drive (HDD), to store data normally stored in RAM. In such instances, the storage space used to store the data normally configured to be stored in RAM typically is referred to as "virtual memory." Although the use of virtual memory can prevent a system from encountering an "out of memory" condition when large amounts of data are targeted to be stored in RAM, persistent data storage devices usually are much slower that RAM. More particularly, persistent data storage devices typically have lower input/out bandwidth than RAM. Thus, when virtual memory is used, the performance (e.g., speed) of application execution usually is degraded.

BRIEF SUMMARY

One or more embodiments disclosed within this specification relate to optimization of local memory usage.

An embodiment can include a method of optimizing an application to reduce local memory usage. The method can include instrumenting at least one executable class file of the application with analysis code, the executable class file including bytecode. The method also can include executing the class file on a virtual machine, wherein during execution the analysis code generates data related to the application's use of local memory. The method further can include, via a processor, analyzing the data related to the application's use of the local memory to generate a memory profile analysis. The method further can include, based on the memory profile analysis, automatically revising at least one portion of the bytecode to reduce an amount of the local memory used by the application.

Another embodiment can include a method of optimizing an application to reduce local memory usage. The method can include instrumenting at least one executable class file of the application with analysis code, the executable class file including bytecode. The method also can include executing the class file on a virtual machine, wherein during execution the analysis code generates data related to the application's use of local memory. The method further can include, via a processor, analyzing the data to identify at least one string that is duplicated by the bytecode, and revising the bytecode to intern the string rather than creating a duplicate string. The method also can include analyzing the data to identify at least one object or string that is loaded into the local memory when the object or string is not yet required by the application, and revising the bytecode to prevent the object or string from being loaded into the local memory until the object or string is required by the application. The method further can include analyzing the data to identify an amount of local memory allocated for at least one object or string, wherein the amount of local memory allocated for the object or string is greater than an amount of local memory utilized by the object or string, and revising the bytecode to reduce the amount of the local memory allocated for the object or string.

DETAILED DESCRIPTION

Figure 1:
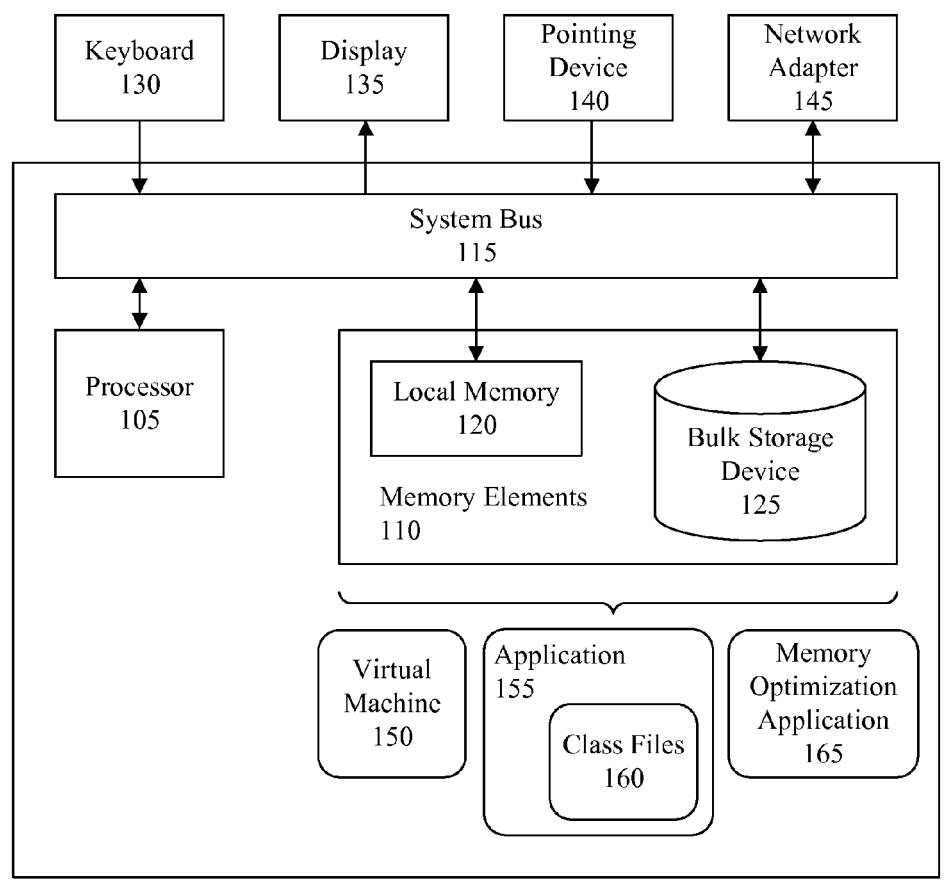
FIG. 1 is a block diagram illustrating a system for optimizing an application to reduce local memory usage in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments in accordance with the present invention relate to optimizing an application to reduce local memory usage. More particularly, bytecode of executable class files (hereinafter "class files") of an application configured to be executed by a virtual machine can be automatically modified to improve the efficiency of local memory usage by the application. In illustration, the class files can be instrumented with analysis code, which also can be configured as bytecode. During execution of the class files on the virtual machine, the analysis code can generate data related to the application's use of local memory, for example memory usage trace files and/or a list of objects for which local memory is allocated. This data can be automatically analyzed to generate a memory profile analysis. Based on the memory profile analysis, the bytecode in the class files can be automatically revised to reduce an amount of the local memory used by the application.

FIG. 1 is a block diagram illustrating a system 100 for optimizing an application to reduce local memory usage in accordance with one embodiment of the present invention. In one aspect, system 100 can be a computer, such as a server, a workstation, a personal computer (e.g., desktop computer), a mobile computer, a tablet computer, a personal digital assistant (PDA), a mobile phone, or any other processing device suitable for executing an application using a virtual machine. As used herein, the term "virtual machine" means program code that utilizes a portion of a computer system or of a computer's time and functions, from the perspective of an application executed by the virtual machine, as though it were a complete operating system, although in reality the computer is shared with at least one other independent operating system. In other words, the application need only be configured to be executed by the virtual machine, regardless of whether the virtual machine itself executes on another operating system, or simultaneously with another operating system. In this regard, a virtual machine can be a software implementation of a machine that executes programs like a physical machine. One example of a virtual machine is Java™ virtual machine, but the invention is not limited to this example.

The system 100 can include at least one processor 105 coupled to memory elements 110 through a system bus 115 or other suitable circuitry. As such, the system 100 can store program code within memory elements 110. The processor 105 can execute the program code accessed from the memory elements 110 via the system bus 115. In one aspect, for example, the system 100 can be implemented as computer that is suitable for storing and/or executing program code. It should be appreciated, however, that the system 100 can be implemented in the form of any system including a processor and memory that is capable of performing the functions and/or operations described within this specification.

The memory elements 110 can include one or more physical memory devices such as, for example, local memory 120 and one or more bulk storage devices 125. Local memory 120 refers to random access memory or other non-persistent memory device(s) generally used during actual execution of the program code. The bulk storage device(s) 125 can be implemented as a hard disk drive (HDD), a solid state drive (SSD), or other persistent data storage device. The system 100 also can include one or more cache memories (not shown) that provide temporary storage of at least some program code in order to reduce the number of times program code must be retrieved from bulk storage device 125 during execution.

Input/output (I/O) devices such as a keyboard 130, a display 135, and a pointing device 140 optionally can be coupled to the system 100. The I/O devices can be coupled to the system 100 either directly or through intervening I/O controllers. One or more network adapters 145 also can be coupled to the system 100 to enable the system 100 to become coupled to other systems, computer systems, remote printers, and/or remote storage devices through intervening private or public networks. Modems, cable modems, and Ethernet cards are examples of different types of network adapters 145 that can be used with the system 100.

As pictured in FIG. 1, the memory elements 110 can store a virtual machine 150 and an application 155. The virtual machine 150, being implemented in the form of executable program code, can be executed by the system 100 and, as such, can be considered part of the system 100. The application 155 can include one or more class files 160, which may be executed by the virtual machine 150 to perform functions and processes provided by the application 155. The class files 160 can be generated by compiling source files for the application 155 into bytecode configured to be executable by the virtual machine 150. For example, if the virtual machine is a Java™ virtual machine, the class files 160 can include the bytecode resulting from the source code compilation and can be named using a ".class" extension. When the application is run, the class files 160 can be loaded into the Java™ virtual machine to be executed by the Java™ virtual machine.

The memory elements 110 also can store a memory optimization application 165. The memory optimization application 165 also can be implemented in the form of executable program code and can be executed by the system 100. As such, the memory optimization application 165 can be considered part of the system 100.

Figure 2:
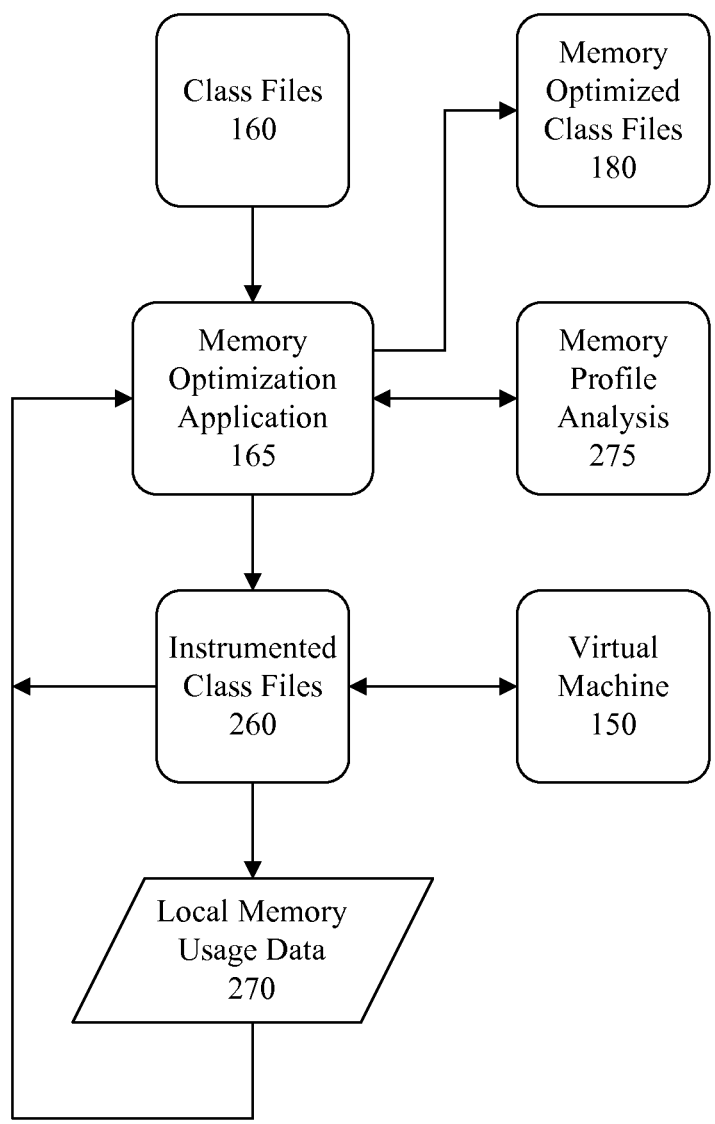
FIG. 2 is a flow diagram illustrating a process of optimizing an application to reduce local memory usage in accordance with another embodiment disclosed within this specification.

FIG. 2 is a flow diagram illustrating a process 200 of optimizing an application to reduce local memory usage in accordance with another embodiment disclosed within this specification. In operation, the memory optimization application 165 can process the class files 160 to instrument the class files 160 with analysis code to generate instrumented class files 260.

In illustration, the memory optimization application 165 can insert into the bytecode of the class files 160 additional bytecode that generates data related to the application's use of local memory when the instrumented class files 260 are executed by the virtual machine 150. Such data can include, for example, one or more memory usage trace files and a list of objects that are live when a corresponding fix point occurs during execution of the class files. As used herein, a "fix point" is a point in the bytecode of an instrumented class file 260 (e.g., where instrumentation bytecode has been inserted into the class file) where it is appropriate to measure the amount of local memory used by the objects that are live. As used herein, a "live object" is a named persistent object defined by the application that can be retrieved by the object's name during execution of the class files (e.g., the instrumented class files 260).

At the behest of the memory optimization application 165, or a user, the virtual machine 150 can execute the instrumented class files 260. During such execution, the instrumented bytecode can generate local memory usage data 270 and communicate the local memory usage data 270 to the memory optimization application 165, or store the local memory usage data 270 to memory elements for retrieval by the memory optimization application 165. The memory optimization application 165 can analyze this data to generate a memory profile analysis 275.

Based on the memory profile analysis 275, the memory optimization application 165 can automatically revise one or more portions of the bytecode in the instrumented class files 260 to reduce an amount of the local memory used by the application. The revised instrumented class files 260 can again be executed by the virtual machine 150, and the process can continue until the instrumented class files 260 are sufficiently optimized to reduce local memory usage. The determination of when the instrumented class files 260 are sufficiently optimized can be based on subsequent memory profile analysis that shows that the instrumented class files 260 are using local memory resources efficiently.

The memory optimization application 165 can perform a number of different types of transformations on the class files 160, 260 to reduce the amount of the local memory used by the application. For example, the memory optimization application 165 can identify strings duplicated by the bytecode at run time, and revise the bytecode to intern the strings rather than duplicating the strings, for example using an "intern( )" method. As used herein, to intern a string means to implement a method to store a single copy of a sting, for example in a string intern pool. In one embodiment, the duplicated strings that are identified can be duplicate strings that are live when a corresponding fix point occurs during execution of the class files.

In another example, the memory optimization application 165 can identify objects and/or strings that are loaded into the local memory when the objects/strings are not yet required by the application, and revise the bytecode to prevent the objects or strings from being loaded into the local memory until the objects or strings are required by the application, which can be referred to as "lazy loading." Further, a list of files in the bytecode that were modified can be output and stored. This list can be reviewed when future builds are implemented in order to avoid further class searches for those files, thereby minimizing application build time.

In yet another example, the memory optimization application 165 can identify an amount of local memory allocated for respective objects and/or strings, wherein the amount of local memory allocated for the respective objects/strings is greater than an amount of local memory utilized by the objects/strings. The memory optimization application 165 can revise the bytecode to reduce the amount of the local memory allocated for the respective objects/strings. For instance, the memory optimization application 165 can reduce the amount of the local memory allocated for each object/string to an average amount of local memory utilized by the object/string. By way of example, the memory optimization application 165 can change a default memory slot size in container for a particular object/string. When the application is executed by the virtual machine, if additional local memory is needed for a particular object/string, the virtual machine can dynamically increase the slot size for that object/string in the container.

Some objects or strings may be quite large, for example greater than 256 kB, which may indicate that the strings or objects are quite complex. The memory optimization application 165 can configured to leave unmodified (i.e. not revise) the bytecode for such objects or strings during the optimization process, thereby reducing the risk of the memory optimization process causing the application to execute in an undesired manner.

In an embodiment in which the process 200 is implemented during application development, the memory optimization application 165 can process the final version of the instrumented class files 260 to remove the instrumentation bytecode to generate memory optimized versions 280 of the class files, which may be deployed for use by end users.

In an embodiment in which the process 200 is implemented in a production environment to dynamically adjust the bytecode when the application is deployed and executed by an end user, the memory optimization application 165 need not remove the instrumentation bytecode. Accordingly, if different class files 160 are executed at different times when various instances of the application are executed, such class files 160 can be revised dynamically when the memory profile analysis 275 indicates that the class files 160 are not sufficiently optimized to use memory efficiently. In this regard, the memory optimization application 165 can be integrated into the application. For example, in one non-limiting embodiment, the memory optimization application 165 can be included in the application's source code, and one or more corresponding class files can be generated when the application is compiled into bytecode in order to perform memory optimization on the application when the application is executed by the virtual machine 150.

Figure 3:
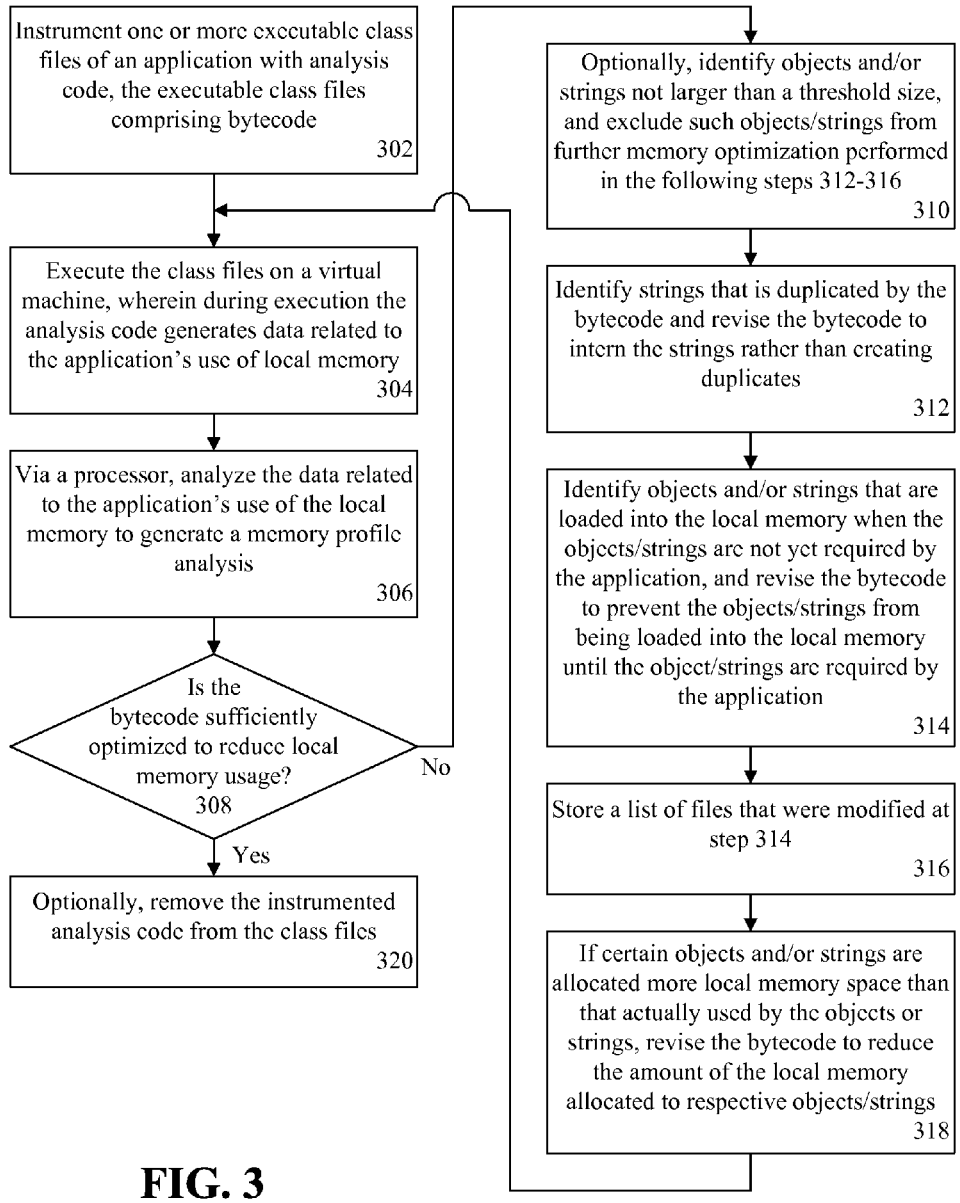
FIG. 3 is a flow chart illustrating a method of optimizing an application to reduce local memory usage in accordance with another embodiment disclosed within this specification.

FIG. 3 is a flow chart illustrating a method 300 of optimizing an application to reduce local memory usage in accordance with another embodiment disclosed within this specification. At step 302, one or more executable class files of an application can be instrumented with analysis code. The executable class files can comprise bytecode generated by compiling source code of the application. At step 304, the class files can be executed on a virtual machine. During execution of the class files, the analysis code can generate data related to the application's use of local memory. The data can include, for example, a memory usage trace file and a list of objects and/or strings that are live when fix points occur during execution of the class files.

At step 306, via a processor, the data related to the application's use of the local memory can be analyzed to generate a memory profile analysis. At decision box 308, if the bytecode is not sufficiently optimized, the method can proceed to step 310. At step 310, optionally, objects and/or strings that are larger than a threshold size (e.g., 256 kB) can be identified. Such objects and/or strings can be excluded from further memory optimization performed in the following steps 312, 314, 316, 318. Objects and/or strings that are not larger than the threshold size can be included in the further memory optimization performed in the following steps 312, 314, 316, 318.

At step 312, strings that are duplicated by the bytecode can be identified and the bytecode can be revised to intern the strings rather than creating duplicates. As noted, the strings that are identified can be strings that are live when one or more fix points are reached during execution of the class files.

At step 314, objects and/or strings that are loaded into the local memory when the objects/strings are not yet required by the application can be identified. The bytecode can be revised to prevent the objects and/or strings from being loaded into the local memory until the objects/strings are required by the application. In other words, the bytecode can be configured to lazy load the objects and/or strings. At step 316, a list of the files that were modified at step 314 can be stored, for example to memory elements. As noted, this list can be reviewed when future builds are implemented in order to avoid further class searches for those files, thereby minimizing application build time.

At step 318, if certain objects and/or strings are allocated more local memory space than that actually used by the objects or strings, the bytecode can be revised to reduce the amount of the local memory allocated to respective objects/strings. The process then can return to step 304 and repeat until at decision box 308 a determination is made that the bytecode is sufficiently optimized to reduce local memory usage. When this occurs, optionally, at step 320 the instrumented analysis code can be removed from the class files. Notwithstanding, the invention is not limited in this regard. As noted, the application can be deployed to a production environment, wherein the class files comprise the instrumented analysis code, thereby facilitating dynamic memory optimization in the production environment.

Like numbers have been used to refer to the same items throughout this specification. The flowchart and block diagrams in the Figures illustrate the architecture, functionality, and operation of possible implementations of systems, methods and computer program products according to various embodiments of the present invention. In this regard, each block in the flowchart, flow diagram or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart, flow diagram or block diagram illustrations, and combinations of blocks in the flowchart, flow diagram or block diagram illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of optimizing an application to reduce local memory usage, the method comprising:
instrumenting at least one executable class file of the application with analysis code, the executable class file comprising bytecode; executing the class file on a virtual machine, wherein during execution the analysis code generates data related to the application's use of local memory;
via a processor, analyzing the data related to the application's use of the local memory to generate a memory profile analysis, wherein analyzing the data related to the application's use of the local memory to generate the memory profile analysis comprises identifying at least one object or string that is loaded into the local memory when the object or string is not yet required by the application; and
based on the memory profile analysis, automatically revising at least one portion of the bytecode to reduce an amount of the local memory used by the application, wherein automatically revising at least one portion of the bytecode to reduce the amount of the local memory used by the application comprises revising the bytecode to prevent the object or string from being loaded into the local memory until the object or string is required by the application.

2. The method of claim 1, wherein:
  analyzing the data related to the application's use of the local memory to generate the memory profile analysis further comprises:
    identifying at least one string that is duplicated by the bytecode; and automatically revising at least one portion of the bytecode to reduce the amount of the local memory used by the application further comprises:
    revising the bytecode to intern the string rather than creating a duplicate string.

3. The method of claim 1, wherein the data related to the application's use of the local memory comprises:
  at least one memory usage trace file and a list of objects or strings that are live when a fix point occurs during execution of the class file, wherein the fix point is a point in the bytecode where it is appropriate to measure the amount of local memory used by the objects or strings that are live.

4. The method of claim 1, further comprising:
  responsive to revising the portion of bytecode, again executing the class file on the virtual machine, wherein during execution the analysis code generates new data related to the application's use of local memory; and
  analyzing the new data related to the application's use of the local memory to generate another memory profile analysis.

5. The method of claim 1, wherein automatically revising at least one portion of the bytecode to reduce the amount of the local memory used by the application further comprises:
  revising the bytecode in a production environment to dynamically adjust the bytecode when the application is deployed and executed by an end user.

6. A method of optimizing an application to reduce local memory usage, the method comprising:
  instrumenting at least one executable class file of the application with analysis code, the executable class file comprising bytecode;
  executing the class file on a virtual machine, wherein during execution the analysis code generates data related to the application's use of local memory;
  via a processor, analyzing the data related to the application's use of the local memory to generate a memory profile analysis, wherein analyzing the data related to the application's use of the local memory to generate a memory profile analysis comprises identifying an amount of local memory allocated for at least one object or string, wherein the amount of local memory allocated for the object or string is greater than an amount of local memory utilized by the object or string; and
  based on the memory profile analysis, automatically revising at least one portion of the bytecode to reduce the amount of the local memory allocated for the object or string to an average amount of local memory utilized by the object or string.

7. A method of optimizing an application to reduce local memory usage, the method comprising:
  instrumenting at least one executable class file of the application with analysis code, the executable class file comprising bytecode;
  executing the class file on a virtual machine, wherein during execution the analysis code generates data related to the application's use of local memory;
  via a processor, analyzing the data to identify at least one string that is duplicated by the bytecode, and revising the bytecode to intern the string rather than creating a duplicate string;
  analyzing the data to identify at least one object or string that is loaded into the local memory when the object or string is not yet required by the application, and revising the bytecode to prevent the object or string from being loaded into the local memory until the object or string is required by the application; and
  analyzing the data to identify an amount of local memory allocated for at least one object or string, wherein the amount of local memory allocated for the object or string is greater than an amount of local memory utilized by the object or string, and revising the bytecode to reduce the amount of the local memory allocated for the object or string.

* * * * *